United States Patent Office 3,095,954
Patented July 2, 1963

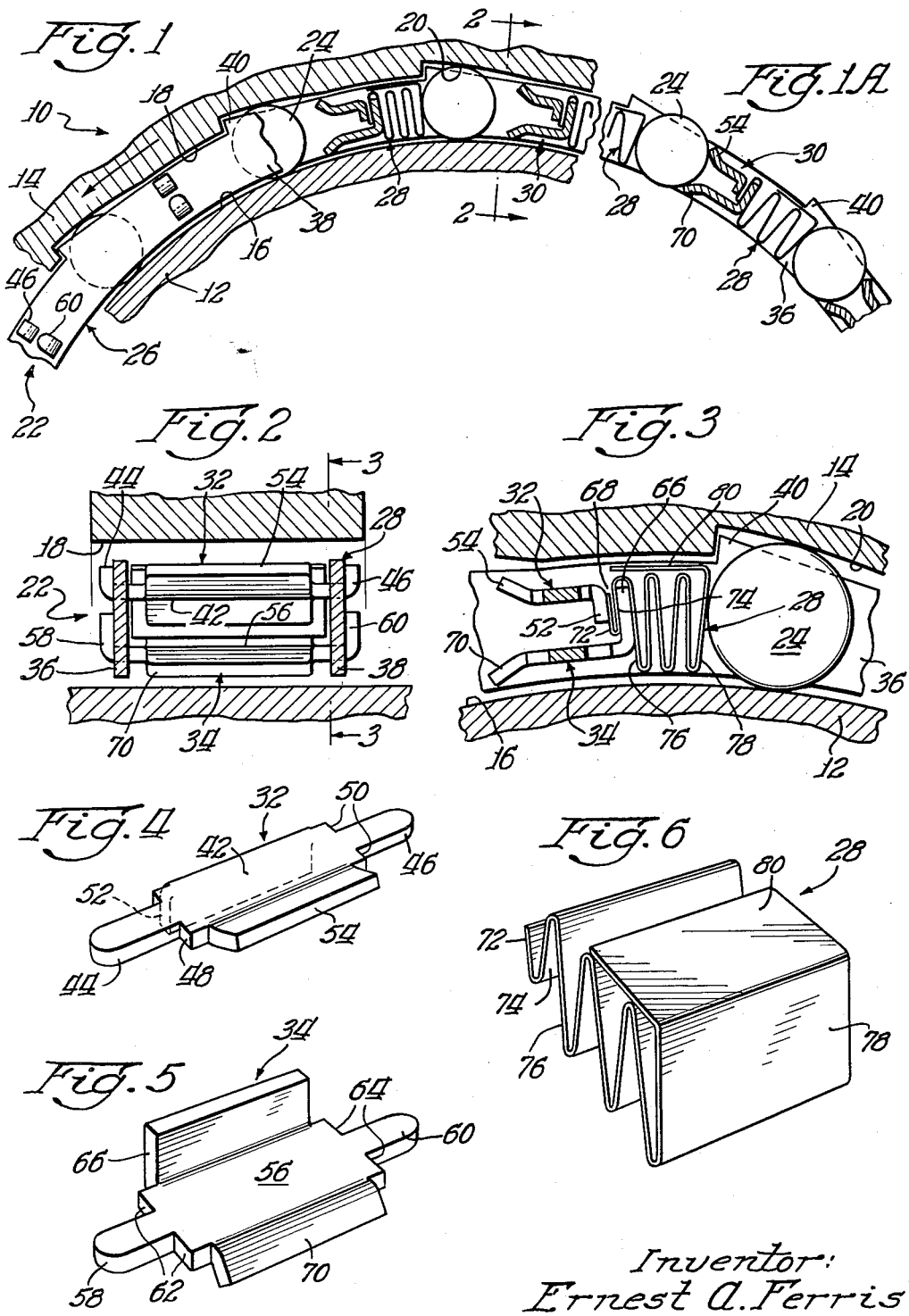

3,095,954
NON-PHASED ONE-WAY ROLLER CLUTCH
Ernest A. Ferris, Downers Grove, Ill., assignor to Borg-Warner Corporation, Chicago, Ill., a corporation of Illinois
Filed Apr. 28, 1961, Ser. No. 106,320
6 Claims. (Cl. 192—45)

This invention relates to one-way clutches, and more particularly to one-way clutches of the roller and cam type to prevent a relative rotation between races in one direction while permitting free relative rotation in the opposite direction.

One of the objects of this invention is to provide a compact roller clutch unit comprising a roller cage, rollers and roller energizing means in a unitary preassembled unit which may be inserted as a unit and removed as a unit from between an inner and outer race.

Another object of this invention is to provide a roller and cage assembly made up of simple and easily assembled parts in order to provide a device which is extremely inexpensive to manufacture.

A further object is to provide in a roller cage assembly, a plurality of cross bars interconnecting the cage side rings which serve as a support means for an energizing spring and which also function in cooperation with an energizing spring means to retain the rollers in the cage.

The above and other objects and advantages of the invention will be more readily apparent when read in connection with the accompanying drawings in which:

FIG. 1 is a partial view partially in section, showing a portion of a roller clutch unit positioned between an inner race and an outer cammed race;

FIG. 1A is a partial view of a portion of the roller clutch unit as it would appear when not assembled between races.

FIG. 2 is a partial view taken along line 2—2 of FIG. 1, illustrating one method of interconnecting the cage side rings with cross bars;

FIG. 3 is an enlarged partial view taken along line 3—3 of FIG. 2 showing in detail how the energizing spring is supported in the cross bar means;

FIG. 4 is a perspective view of the upper or radially outermost cross bar shown in FIG. 2 as it appears prior to assembly;

FIG. 5 is a perspective view of the lower cross bar (as shown in FIG. 2) as it appears prior to assembly;

FIG. 6 is a perspective view of one of the energizing springs such as is associated with each wedging element.

Referring now to the drawings wherein like numbers in different views identify identical parts, the device 10 illustrated in FIG. 1 is a partial view of an overrunning or one-way clutch device. The device 10 comprises inner and outer members 12 and 14 having respectively formed thereon inner and outer races 16 and 18. The outer race 18 has formed thereon, a series of cammed surfaces 20.

The device 10 also comprises a preassembled roller clutch unit 22 which may be conveniently placed between the inner and outer members and may be removed as a unit from between these members.

The roller clutch unit 22 comprises a plurality of rollers 24, a roller cage or a retaining member 26, a plurality of energizing springs 28.

The rollers 24 are disposed between the inner and outer races. These rollers are effective to make the inner and outer members 12 and 14 rotate as a unit, when the outer member 14 tends to rotate counter clockwise as indicated by the arrow in FIG. 1 with respect to the inner member 12. On the other hand, when the outer member 14 tends to rotate clockwise with respect to the inner member 12, the device assumes an overrunning condition.

The roller cage 26 comprises a plurality of pairs of cross bar means 30. Each of the cross bar means 30 as shown in this particular embodiment comprises a pair of radially spaced cross bars 32 and 34. The roller cage 26 also comprises two radially extending flat cage side rings 36 and 38 which are axially spaced and interconnected by the cross bars 32 and 34 as shown in FIG. 2. Each of the cage side rings has formed on its outermost periphery, a series of projections 40 having a sawtooth-like appearance. These projections are associated with the complementary portions of the outer race 18, and are effective to limit movement of the outer cammed race with respect to the cage when the device is in an overrunning condition.

The upper or radially outermost cross bar 32 is formed with a central body portion 42 from which extend a pair of tabs 44 and 46 as shown in FIG. 4. In an assembled condition in a cage structure the tabs 44 and 46 project through openings in the cage side rings 36 and 38, and the tabs 44 and 46 are then bent upwardly as shown in FIG. 2. Thus the cage side rings are effectively spaced by being positioned against the edges 48 and 50 formed on the body portion 42 of the cross bar 32. Extending from one side of the body portion 42 is a depending flange 52 which may be formed substantially at right angles to the body portion 42. In an assembled condition, the flange 52 extends substantially radially inwardly. On the opposite side of the body portion 42 from the flange 52 there is formed another flange 54 extending at an upward angle from the body portion 42 as viewed in FIG. 3, for example. The flange 54 forms part of a roller retaining means as hereinafter more fully explained. The lower or radially innermost cross bar 34 as viewed in FIG. 2 has a central body portion 56 from which extend at either end thereof, tabs 58 and 60. The edges 62 and 64 formed at opposite ends of the body portion 56 are effective together with the edge portions 48 and 50 of the cross bar 32 to space the cage side rings 36 and 38 in the assembled cage structure. The tabs 58 and 60 extend through openings in the cage side rings 36 and 38 and are then bent upwardly as shown in FIG. 2 just as are the tabs 44 and 46, and thus, hold the cage side rings in a secured position. The body portion 56 of the cross bar 34 has formed at one side thereof, an upstanding flange 66 as viewed in FIGS. 3 and 5. In the assembled cage structure the flange 66 extends substantially radially outwardly, thus defining a space 68 between the flange 52 of the cross bar 32 and the flange 66. Also formed on the body portion 56 is an angularly extending flange 70. It is bent somewhat inwardly (see FIG. 3) as distinguished from the flange 54 on the cross bar 32 which is bent somewhat outwardly. Thus the two flanges 54 and 70 from a substantially V-shaped axially extending groove which functions as a roller retaining means as shown in FIG. 1A.

The energizing springs 28 are of the accordion type. At one end of each of the springs 28, a portion 72 of the last leaf 74 is bent back upon itself as shown in FIG. 6. This whole portion is inserted into the space 68 between the flanges 52 and 66 of the cross bars 32 and 34 respectively as shown in FIG. 3. Thus the leaves 74 and 76 of the accordion spring 28 are positioned over the flange 66 and the spring is adequately supported on the cross bar means 30. It will be noted that in the assembled condition the cross bar means 30 functions as a reaction member for each of the accordion springs. An extended portion 80 is formed on the last leaf 78 of each of the springs 28 and is turned back to pass over a substantial portion of the total length of the spring. This is done to reduce the possibility of the spring being injured during operation of the whole device.

While the device herein described contemplates a one-way clutch device having a cammed surface on the outer member it will be appreciated that all of the features herein described would be equally applicable to a preassembled clutch unit wherein the cammed race was formed on the inner member.

*Operation*

Referring to FIG. 1 it will be noted that if the outer member 14 is considered as the driving member and that it is rotated in a relatively counter clockwise direction as indicated by the arrow, with respect to the inner member 12, the device 10 will rotate as a unit. The rollers 24 will ride up on the cammed surfaces 20 thus wedging the rollers between the inner and outer members. This wedging engagement is due in part of course, to the particular direction of the relative rotational movement of the two members 12 and 14 and also the individual energizing force of each of the springs which tends to urge the respective rollers into engagement. On the other hand, if the outer member 14 is roated clockwise relative to the inner member 12, then the member 14 will overrun the inner member 12 and the individual energizing springs 28 will not be sufficient to effect engagement of the inner and outer races under those conditions.

It will be observed from the above description that this invention advantageously provides an inexpensive, easily manufactured, preassembled clutch unit, wherein inaccuracy of manufacture of the cammed race surfaces will be compensated for by the individual energization of each of the rollers. The simple crossbar construction advantageously provides at one and the same time a method for holding the cage side rings together, a reaction member for the energizing springs, and a roller retaining feature which is effective in cooperation with the springs 28 to keep the rollers in place in the roller clutch unit.

While a preferred embodiment of the invention has been specifically disclosed, it is to be understood that the invention is not limited thereto as many variations will be readily apparent to those skilled in the art and the invention is to be given its fullest possible interpretation within the terms of the following claims.

What is claimed is:

1. In a unitary preassembled clutch unit for a one-way engaging device having inner and outer races said clutch unit comprising: a cage member defined by a pair of axially spaced radially extending side rings, a plurality of crossbar means connecting said side rings, means formed on one side of each of said crossbar means defining retaining means for retaining wedging elements, means on the other side of each of said crossbar means for attaching spring means thereto, said supporting means comprising means defining a slot on said crossbar means and adapted to receive one end of a spring means, a plurality of wedging elements disposed in said cage member and individual spring means attached in said slot means of said crossbar means and disposed respectively between a crossbar means and a wedging element yieldably urging said wedging element into engagement with said retaining means.

2. In a unitary preassembled clutch unit for a one-way engaging device having inner and outer races said clutch unit comprising: a cage member defined by a pair of axially spaced radially extending side rings, a plurality of roller wedging elements disposed in said cage member, individual energizing spring means for energizing each of said wedging elements, and a plurality of crossbar means defining on one side thereof a substantially V-shaped groove for retaining said wedging elements and defining on the other side thereof a construction complementary to the adjacent end of the spring means for supporting said spring means.

3. In a unitary preassembled clutch unit the combination comprising: a cage member defined by a pair of axially spaced radially extending side rings, a plurality of pairs of crossbar means connecting said side rings, means formed on one side of each of said crossbar pairs defining axially extending substantially V-shaped retaining means for retaining wedging elements, means on the other side of each of said crossbar pairs for supporting an energizing spring, a plurality of wedging elements loosely disposed in said cage member, and energizing spring means supported on each of said crossbars urging said wedging elements into engagement with V-shaped retaining means.

4. In a unitary preassembled clutch unit the combination comprising: a cage member defined by a pair of axially spaced radially extending side rings, a plurality of crossbar means connecting said side rings, each of said crossbar means comprising a pair of radially spaced crossbar portions extending between and individually connected to each of said side rings, the radially innermost crossbar portion having formed on one side thereof an inwardly directed tab portion and the radially outermost crossbar having formed on the same side thereof as the innermost crossbar portion an outwardly directed tab portion so that said last two named tab portions form substantially V-shaped wedging element retaining means, individual energizing springs connected to the other side of said crossbar means, and a plurality of wedging elements disposed between said energizing springs and said crossbar means.

5. In a gripper and cage assembly for a one-way engaging device having inner and outer races, the combination comprising a series of grippers adapted to be disposed between the inner and outer races of the engaging device, a cage for said grippers comprising two radially extending sheet metal ring portions on opposite sides of the grippers, a plurality of pairs of inner and outer sheet metal crossbar portions disposed between each two adjacent grippers, each of said inner and outer sheet metal crossbar portions being formed so as to define an axially extending groove on one side of each of said pairs for supporting a gripper, means on the other side of each of said pairs of said sheet metal crossbar portions for supporting an energizing spring, and energizing spring means disposed adjacent each gripper effective to urge said gripper into the adjacent groove.

6. The device of claim 5 wherein the energizing spring supporting means comprises means defining a slot formed by a substantially radially outwardly and inwardly extending flange of said inner and outer crossbar respectively.

References Cited in the file of this patent
UNITED STATES PATENTS

| | | |
|---|---|---|
| 2,371,653 | Schuckers | Mar. 20, 1945 |
| 2,973,847 | Stockton | Mar. 7, 1961 |